United States Patent [19]

Kortenbusch et al.

[11] Patent Number: 4,824,294

[45] Date of Patent: Apr. 25, 1989

[54] METHOD OF AND EQUIPMENT FOR HYDRAULIC FORWARDING OF SOLIDS OVER LONG DISTANCES AND/OR TO DIFFERENT HEIGHTS; IN PARTICULAR IN UNDERGROUND MINESHAFTS

[75] Inventors: Michael Kortenbusch, Unna; Kurt A. Osenberg, Wilnsdorf, both of Fed. Rep. of Germany

[73] Assignee: Siemag Transplan GmbH, Netphen, Fed. Rep. of Germany

[21] Appl. No.: 71,386

[22] Filed: Jul. 9, 1987

[30] Foreign Application Priority Data

Jul. 14, 1986 [DE] Fed. Rep. of Germany ....... 3623727

[51] Int. Cl.$^4$ .............................................. B65G 53/30
[52] U.S. Cl. ........................................ 406/93; 406/14; 406/94
[58] Field of Search ................... 406/4, 14, 93, 94, 95

[56] References Cited

U.S. PATENT DOCUMENTS

| | | | |
|---|---|---|---|
| 3,940,184 | 2/1976 | McCain | 406/14 |
| 4,143,922 | 3/1979 | Sweeney | 406/14 |
| 4,453,864 | 6/1984 | Beck et al. | 406/93 |

Primary Examiner—Sherman D. Basinger
Assistant Examiner—Thomas J. Brahan
Attorney, Agent, or Firm—Herbert Dubno

[57] ABSTRACT

The hydraulic forwarding of solids over long distances and/or differences in height is effected by means of tube-chamber distributor systems which operate as pressure locks on the booster principle, where use is made of pressure-measurement instruments, shut-off devices with limit switches and time switches. These control means effect the continual changeover between the filling of the particular tube chamber concerned with the slurry to be forwarded and the emptying of the same by the application of pressures with the forwarding liquid so that, on the one hand, the forwarding liquid which is present in the tube chamber is forced out by the slurry which is being filled into the tube chamber and, on the other hand, the introduction of the forwarding liquid into said tube chamber forces out the slurry contained in said tube chamber. The objective to be achieved is to ensure an optimal filling and emptying of the tube chambers which will be independent of differenet lengths of the forwarding route and varying concentrations of the slurry as well as the number of tube chambers involved in the operations. Therefore, the volume and/or weight of the forwarding liquid which is forced out of the currently involved tube chamber by filling with the slurry is measured and/or collected. Then the emptying of the slurry from said tube chamber is effected by application of pressure to the tube chamber contents with a volume and/or weight of forwarding liquid at least equal to that of the previously measured and/or collected volume and/or weight of forwarding liquid.

19 Claims, 12 Drawing Sheets

METHOD OF AND EQUIPMENT FOR HYDRAULIC FORWARDING OF SOLIDS OVER LONG DISTANCES AND/OR TO DIFFERENT HEIGHTS; IN PARTICULAR IN UNDERGROUND MINESHAFTS

FIELD OF THE INVENTION

The present invention relates to a method of transporting solids such as coal, tailing, salts, ores, sand, dam; construction materials or the like (including ice), over long distances and/or changes in height. In particular, the present invention relates to a method of transporting such solids in underground mines in which the delivery site is either stationary or movable. The method is based on the use of a tube-chamber distributor-system which uses pressure locks on the booster principle and which includes pressure sensors, shut-off devices with limit switches and time switches as control means to enable continual changeover between the filling of a given tube chamber with slurry to be transported and the simultaneous emptying of a transport liquid from the given tube chamber due to the pressure of the slurry being filled into the given tube chamber, and the subsequent filling of the given tube chamber with transport liquid and the simultaneous emptying of the slurry from the given tube chamber using the pressure of the transport liquid being filled into the given tube chamber.

The present invention also relates to apparatus for carrying out the method. The apparatus comprises a tube-chamber distributor-system in which each of the tube chambers may be connected alternately, by way of shut-off devices, to a slurry filling station, to a slurry transport pipeline and to a transport liquid supply line, and wherein each of said tube chambers operates as a pressure lock on the booster principle by the simultaneous opening of the shut-off device to the slurry transport pipeline and to the transport liquid supply line.

BACKGROUND OF THE INVENTION

The hydraulic transport of mineral coal though pipelines, particularly through vertical sections of mine shafts by means of a three-chamber-tube-distributor, has been described in the Journal "Bergbau" 1976, part 12, pages 474 and 475. Such three-chamber-tube-distributors operate in accordance with a cyclic chamber-sluice method in which the tube chambers are in the form of long U-shaped tube loops. The individual tube chambers periodically pass through the three working stages of "filling", "waiting" and "forwarding". The tube chambers are filled with slurry under reduced pressure and are then emptied under high pressure. The filling and emptying of the tube chambers takes place periodically under the influence of a control system so that a quasi-continuous flow of slurry is produced in the transport pipeline. The solids are fluidized in a slurry basin and then pumped as a slurry into the tube chambers by means of a low-pressure filling pump. The chambers are subsequently closed by shut-off slide valves. The slurry is forced out of the tube chambers into a transport pipeline. The above filling and transport procedure is certainly complicated. However, it operates according to a fixed control program and is monitored electronically.

It is also known from the German Auslegeschrift DE-AS No. 24 57 943 that it is possible to transport coal, ores or similar solids over great distances and changes in height hydraulically by means of a three-chamber-tube-distributor and with the addition of only very small amounts of liquid. In this system, on the one hand, the tube chambers act as intermediate boosters and, on the other hand, they act in conjunction with filling and metering equipment as the distributor device.

In this known tube-chamber distributor-system there are constant periods of time for filling and transporting and the control measures are substantially based on the use of timing elements in connection with the pressure measurement instruments and limit switches for the shut-off devices to determine the beginning and the end of a give filling and transporting cycle. Alterations in the pumps, pipelines and instruments caused by abrasive wear-and-tear are compensated for within certain limits by adjustment of the timing elements.

However, any sudden fluctuations in the concentration of the slurry, such as when a mixture of several solids of different densities is being transported, can cause alterations of the filling and transporting time intervals which, because of the rigid timing schedule of the timing elements, cannot be compensated for in the short term.

One consequence of the foregoing is that during the filling cycle of a tube chamber either the available volume of the chamber is not fully exploited or an over-filling of the chamber occurs. In the latter case, there can be serious consequences because solids are able to pass through the chamber into the return-flow or supply sections of the transport liquid pipeline from where they can be deposited, in an undesirable manner, in the shut-off devices. In order to be able to avoid blockages and excessive abrasive wear-and-tear it is necessary to use shut-off devices which are comparable in size to the shut-off devices which regulate the admission and discharge of the slurry into and from the tube chamber. However, for the return-flow and the supply of the transport liquid it would be quite feasible to operate with substantially smaller shut-off devices.

During the transport cycle of the known tube-chamber distributor-system in situations in which the total available volume of the chamber is not fully exploited during the preceding filling cycle there is an undesirable introduction of a considerable volume of transport liquid into the transport pipeline following the expulsion of the slurry from the chamber.

Quite apart from the fact that the volume of transport liquid involved is not available for subsequent re-use, and must therefore be replaced the effective transport capacity for slurry is reduced and therefore the operating costs for the whole installation are unnecessarily increased.

On the other hand, if an over-filling of the available volume of the chamber with slurry occurs during the filling cycle the result is that there is not a complete emptying of the chamber during the successive transport cycle. As a consequence, during the next filling cycle, there is once again an over-filling of the chamber.

The known tube-chamber distributor-systems also operate unsatisfactorily in situations where they are used for the transport of slurry to a movable delivery location. The speed of the transport process alters when the length of the transport pipelines is altered with the result that the cycle times necessary for optimal exploitation of the tube chambers are also altered. Adjustment of the switching operations necessary for optimal exploitation of the tube chambers is not possible in view of the fixed control program.

OBJECT OF THE INVENTION

The object of the present invention is to alleviate the foregoing inadequacies and to provide a method of transporting solids which is independent of different lengths of the transport route and varying concentrations of the slurry, which will enable optimal filling and emptying of the tube chambers, which and can be used with any number of tube chambers.

It is also an object of the invention, to provide an apparatus for carrying out the method in which the occurrence of abrasive wear-and-tear of the shut-off devices and all other fittings can be minimized with a simultaneous reduction of the initial capital costs for the installation.

SUMMARY OF THE INVENTION

In accordance with the present invention there is provided a method which is characterized in that the quantity (i.e. volume and/or weight) of the transport liquid which is forced out of a given tube chamber by incoming slurry is measured and/or collected, and that subsequent emptying of the slurry from said given tube chamber is effected by introducing into the given tube chamber a quantity (i.e. volume and/or weight) of transport liquid which is at least equal to that of the previously measured and/or collected weight and/or volume of transport liquid.

The main advantage of the above method of operation is that the amount of transport liquid forced into the tube chamber under high pressure for carrying out each transport cycle is directly dependent upon the amount of slurry which was previously introduced into the tube chamber under low pressure, and thus an optimal transport effect for the whole of the system is thereby ensured.

The signals which are necessary for initiation and termination of the filling cycle and of the transport cycle are then derived solely from the volume and/or weight measurements of the transport liquid if the optimal amount of transport liquid has been introduced into the tube chamber and then discharged from it again.

It is preferred that the transport liquid which is discharged is collected in measuring vessels so that, in all cases, the level of the liquid before the beginning of the discharge may be compared with the level of the liquid on completion of the discharge.

It is also possible to determine the amount of transport liquid discharged from a particular tube chamber by means of a flow-meter.

It is preferred that the amount of transport liquid discharged from the given tube chamber is collected in several relatively small portions which are subsequently fed simultaneously into the tube chamber in order to expel slurry therefrom.

In an alternative arrangement it is preferred that the amounts of transport liquid discharged from several tube chambers be collected together in a common receptacle for use later in several separate portions for expelling slurry from various ones of the tube chambers.

It is particularly preferred that the amount of transport liquid discharged, compared with the previously discharged amount, be proportionally supplemented by at least the volume required to fill the shut-off device through which the liquid flows on the transport side.

In one arrangement the slurry and the transport liquid are supplied to and discharged from the given tube chamber on the co-current principle.

In an alternative arrangement the slurry and the transport liquid are supplied to and discharged from the given tube chamber on the countercurrent principle.

A preferred apparatus for carrying out the above method comprises a tube-chamber distributor-system in which each of the tube chambers, on the one hand, is connected alternately by way of shut-off devices to the slurry filling station and to a slurry transport pipeline and, on the other hand, is connected, also alternatingly, to a slurry transport pipeline and to a transport liquid supply line, wherein each of said tube chambers operates in use as a pressure sluice on the booster principle by the simultaneous opening of the shut-off device to the slurry transport pipeline and to the transport liquid supply line. A volume and/or weight measuring system is allocated to the return circulation of the transport liquid to each tube chamber for determining the amount of (low-pressure) transport liquid returned, which as the make-up, control and/or regulating system for the amount of (high pressure) transport liquid supplied, is in communication with the source of transport liquid.

It is preferred that the volume and/or weight measuring system comprise at least one flow-volume meter and a collection receptacle connected to the transport liquid return circulation pipeline(s) of the tube chamber(s).

It is particularly preferred that the volume and/or weight measuring system for each tube chamber be provided with its own flow-volume meter.

It be particularly preferred that each tube chamber is provided with at least one collection receptacle of its own.

Typically the flow-volume meter for each tube chamber is connected to a computer which, in turn, is used to modulate the make-up, control and/or regulating system for the supply of (high-pressure) transport liquid to each tube chamber.

It is preferred that the volume and/or weight measuring system includes a measuring container, which contains, as measuring instrument, a minimum-filling-level meter and a maximum-filling-level meter which are in communication with the make-up, control and/or regulating system for the supply of transport liquid.

Preferably each tube chamber can be charged, on the countercurrent principle, alternately with slurry and transport liquid.

In an alternative arrangement, preferably, each tube chamber can be charged, on the co-current principle, alternately with slurry and transport liquid.

It is preferred that the shut-off devices from the transport liquid supply to the tube chambers and the shut-off devices from the tube chambers to the transport liquid return circulation are in each case of smaller dimensions than the shut-off devices from the slurry filling station to the tube chambers as well as the shut-off devices from the tube chambers to the transport pipeline.

It be preferred that the tube-chamber distributor-system is furnished with at least two tube chambers which can be operated alternately for the transport of slurry and for filling with slurry.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
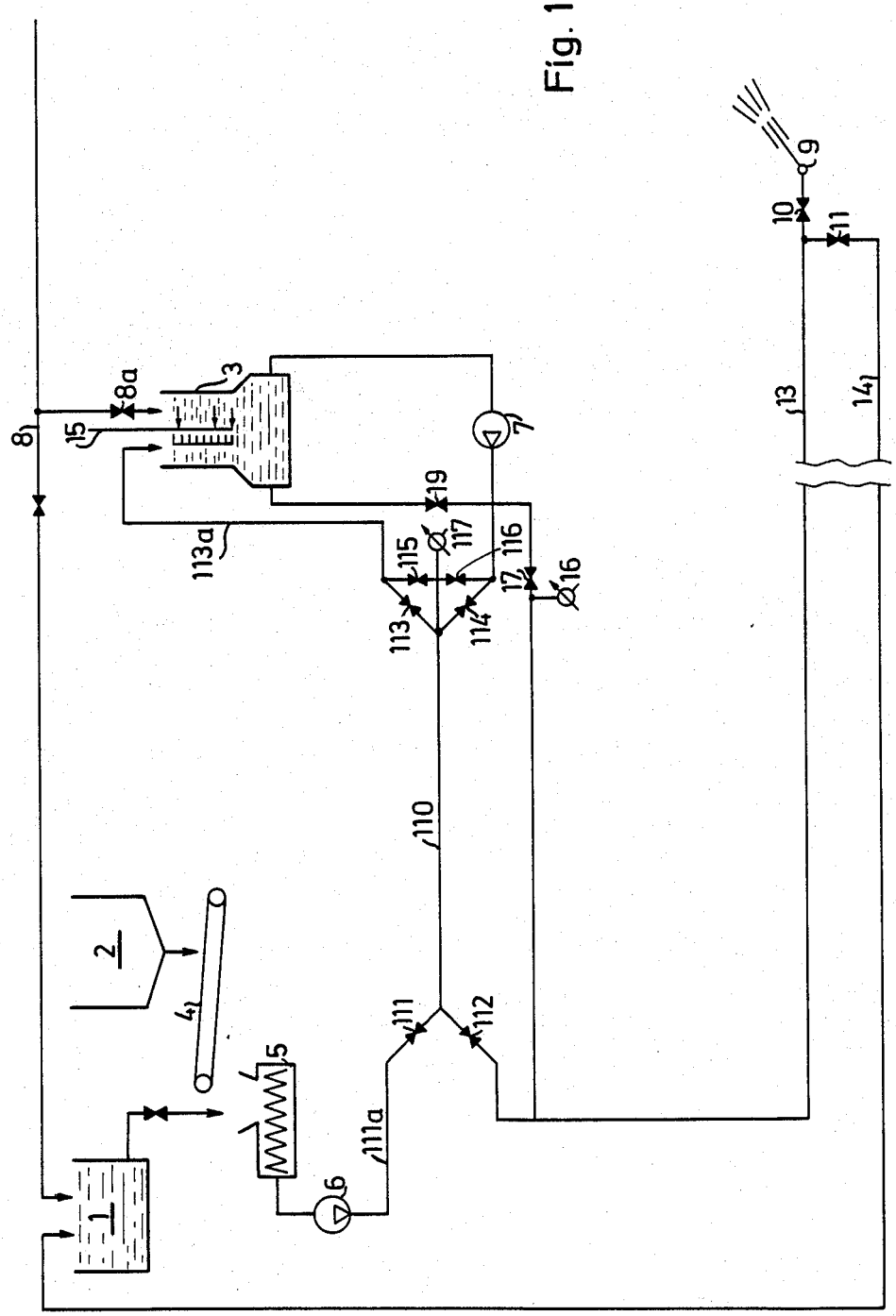
FIG. 1 is a diagrammatic representation of equipment for hydraulic forwarding of solids by means of a tube-chamber distributor-system which has a single tube chamber that may be operated on the counter-current principle.

The tube-chamber distributor-system illustrated in FIG. 1 may be used for forwarding (transporting) solids such as coal, tailings, salt, ores, sand and dam construction materials, ice or the like. It can be used advantageously in underground mine shafts where the solids have to be forwarded over long distances and/or changes in heights. Basically, the tube-chamber distributor-system operates as a pressure sluice on the booster principle.

The tube-chamber distributor-system shown in FIG. 1 is provided with a water reservoir 1 and a silo 2 for solids.

Solid material from the solids silo 2 is fed, by way of a metering device, for example a metering conveyor 4, into a mixer 5 into which an accurately determined quantity of water from the water reservoir 1 is fed at the same time.

The water and solid are mixed together in mixer 5 to form a pumpable slurry and the mixture is forwarded by a pump 6 through the pipeline 111a. The slurry is pumped through pipeline 111a with a periodic rhythm to be filled into tube chamber 110 by alternate opening and closing of the slide valve 111. The same volume of forwarding liquid or plain water is expelled from tube chamber 110 as the volume of slurry that had been filled into it, and this is actually done through an opened gate valve 113 to which a pipeline 113a is connected and which opens into a measuring container 3.

A volume-measuring instrument 15 associated with the measuring container 3 is designed in such a manner that it can be used to determine not only the minimum filling level, but also the maximum filling level in the measuring container 3. With the use of the volume-measuring instrument 15 it is possible to measure exactly the volume of forwarding liquid expelled from tube chamber 110 by the introduction of the slurry into said tube chamber and this volume can be recorded by being input into a data-storage device or into a computer memory.

When the tube chamber 110 has been filled with slurry, both the filling gate valves 111 and 113 are closed, thus completing the filling cycle.

For the subsequent forwarding cycle of the tube-chamber distributor-system, the two forwarding gate valves 114 and 112 are opened. The forwarding liquid required is obtained from the measuring container 3 by means of the forwarding pump 7 and is pumped through forwarding gate valve 114 into tube chamber 110. The same volume of slurry is expelled—in the opposite direction to that of its previous entry—from tube chamber 110 as the volume of forwarding liquid that is filled into it, and this is actually done through the forwarding gate valve 112 into the forwarding pipeline 13.

Each time after the filling cycle of the tube chamber 110 with the slurry is completed, before the commencement of the forwarding cycle, the pressure necessary in tube chamber 110 for the forwarding operation must be built up with aid of the pressure-build-up gate valve 116, and the pressure necessary in the forwarding pipeline 13 must be built up with aid of the pressure-build-up gate valve 17, and this must actually be done within the time interval between the closing of the filling gate valves 111 and 113 and the opening of the forwarding gate valves 114 and 112.

On the other hand, after completion of the forwarding cycle, it is once again necessary to reduce the forwarding pressure in tube chamber 110 with the aid of the pressure-relief gate valve 115, before the filling gate valves 111 and 113 are subsequently opened for the next filling cycle. The pressure build-up and the pressure relief in the tube-chamber distributor-system is effected by the pressure-build-up gate valves 116 and 17 as well as the pressure-relief gate valve 115 operating in conjunction with the contact manometers 117 and 16.

It is very important that the filling gate valves 111 and 113 as well as the forwarding gate valves 114 and 112 should only be opened when the same pressure prevails on both sides of each of said gate valves.

The period of time for each forwarding cycle is determined by the effectual length of the forwarding pipeline 13 between the tube chamber 110 and the delivery point 9 of the forwarding pipeline 13, that is to say, the longer the pipeline 13, the smaller will be the achievable effectual forwarding rate and thus the forwarding operation will take a longer time.

For continuity of the forwarding flow the following criteria apply:

if $T_{Fo}$ = forwarding time interval $T_{Fu}$ = filling time interval $T_{Um}$ = circulation time interval $T_{Sch}$ = switching time interval $T_W$ = waiting time interval then
$$T_{Um} = -T_W$$

and
$$T_{Um} = T_{Fo} + T_{Sch} - T_{Fu}.$$

If the result from the last equation is positive, the forwarding flow achieved is not continuous.

However, if this result is negative, $-T_{Um}$ is replaced with $T_W$ and then the forwarding flow is continuous.

During the circulation time interval $T_{Um}$ the forwarding pump 7 acts as circulating pump, in order to avoid a frequent switching on and off of said pump.

The tube-chamber distributor-system is regulated in such a manner that, in the case of continuous forwarding flow, the circulation equipment and also the pressure-build-up equipment 16 and 17 for the forwarding pipeline 13 are not involved in the control process.

The slurry which is being forwarded passes through the forwarding pipeline 13 to the delivery point 9, at different locations for example, which, in the example of embodiment illustrated, is in the form of a so-called slurry dumper.

Metering of the amount of slurry is possible by means of the working gate valve 10.

After completion of the working operations at the delivery point 9 of the forwarding pipeline 13, namely when the slurry dumper is shut down, the mixer 5, the tube chamber 110 and the forwarding pipeline 13 are thoroughly flushed out with fresh forwarding liquid. During this operation, the metering device 4 for the solids is shut down and the slurry is flushed through the gate valve 111 and the reverse-flushing pipeline 14 into the liquid container 1 for as long as it takes to clean out the fittings and pipeline thoroughly. The solids which settle out in the liquid container 1 are added to the mixing liquid when the forwarding operations are resumed.

To ensure that the forwarding gate valve 112 can only be operated in forwarding liquid in order to prevent abrasive wear-and-tear, at the end of each filling cycle of the tube-chamber distributor-system, a small amount of additional liquid is supplied through the gate valve 8a from the pipeline 8 into the measuring container 3. At the end of the forwarding cycle, this small amount of forwarding liquid will then pass from the tube chamber 110 into the gate valve 112 and will flush out any residual solids which happen to be there.

Figure 2:
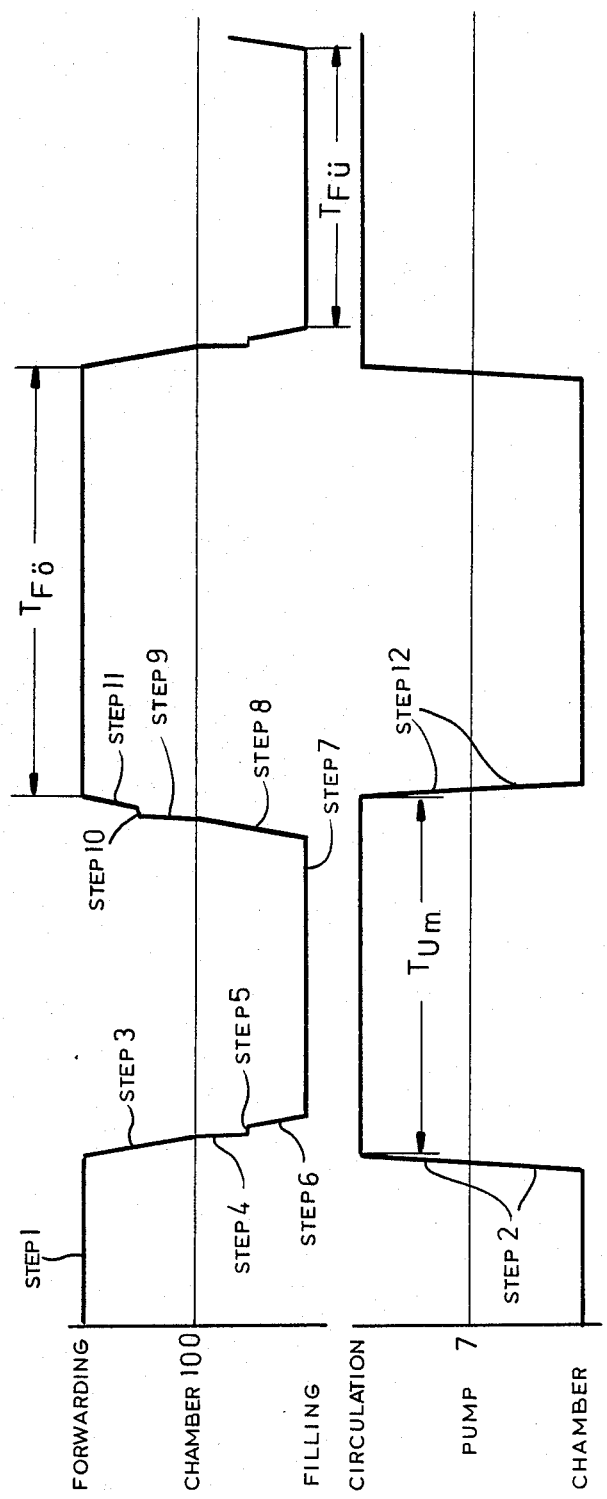
FIG. 2 is a timing- and operating-diagram for control of the tube-chamber distributor-system as shown in FIG. 1 with intermittent filling of, and intermittent forwarding from, the tube chamber.

The method of operation of the tube-chamber distributor-system as depicted in FIG. 1 is, in accordance with FIG. 2 as follows:

Step 1: The volume measuring instrument 15 detects the minimum water level in the measuring container 3. The forwarding cycle is terminated.

Step 2: The forwarding pump 7 is switched over to the circulating operation by opening of the gate valve 19.

Step 3: Forwarding gate valves 112 and 114 as well as pressure-build-up gate valve 116 are closed and shut off the tube chamber 110 after the forwarding cycle.

Step 4: Pressure is reduced in tube chamber 110 and forwarding pipeline 13 by opening the pressure-relief gate valves 17 and 115.

Step 5: The contact manometer 117 then detects the filling pressure in tube chamber 110.

Step 6: Filling gate valves 111 and 113 are opened to begin the filling procedure.

Step 7: The volume measuring instrument 15 detects the maximum liquid level in the measuring container 3 and terminates the filling cycle of tube chamber 10. Make-up liquid is added to the measuring container 3 through the gate valve 8a from pipeline 8.

Step 8: The filling gate valves 111 and 113 as well as the pressure-relief gate valve 115 are closed and shut off the tube chamber 110 after the filling cycle.

Step 9: The pressure-build-up valves 17 and 116 are opened and the pressure is built up in the forwarding pipeline 13 and the tube chamber 110.

Step 10: The contact manometers 16 and 117 then detect the forwarding pressure in the forwarding pipeline 13 and in the tube chamber 110.

Step 11: The forwarding gate valves 112 and 114 are opened and the forwarding procedure is initiated.

Step 12: The pressure-build-up gate valve 17 and the circulation gate valve 19 are closed. The forwarding pump 7 is switched over from circulation to supplying the tube chamber 110 with forwarding liquid.

Figure 3:
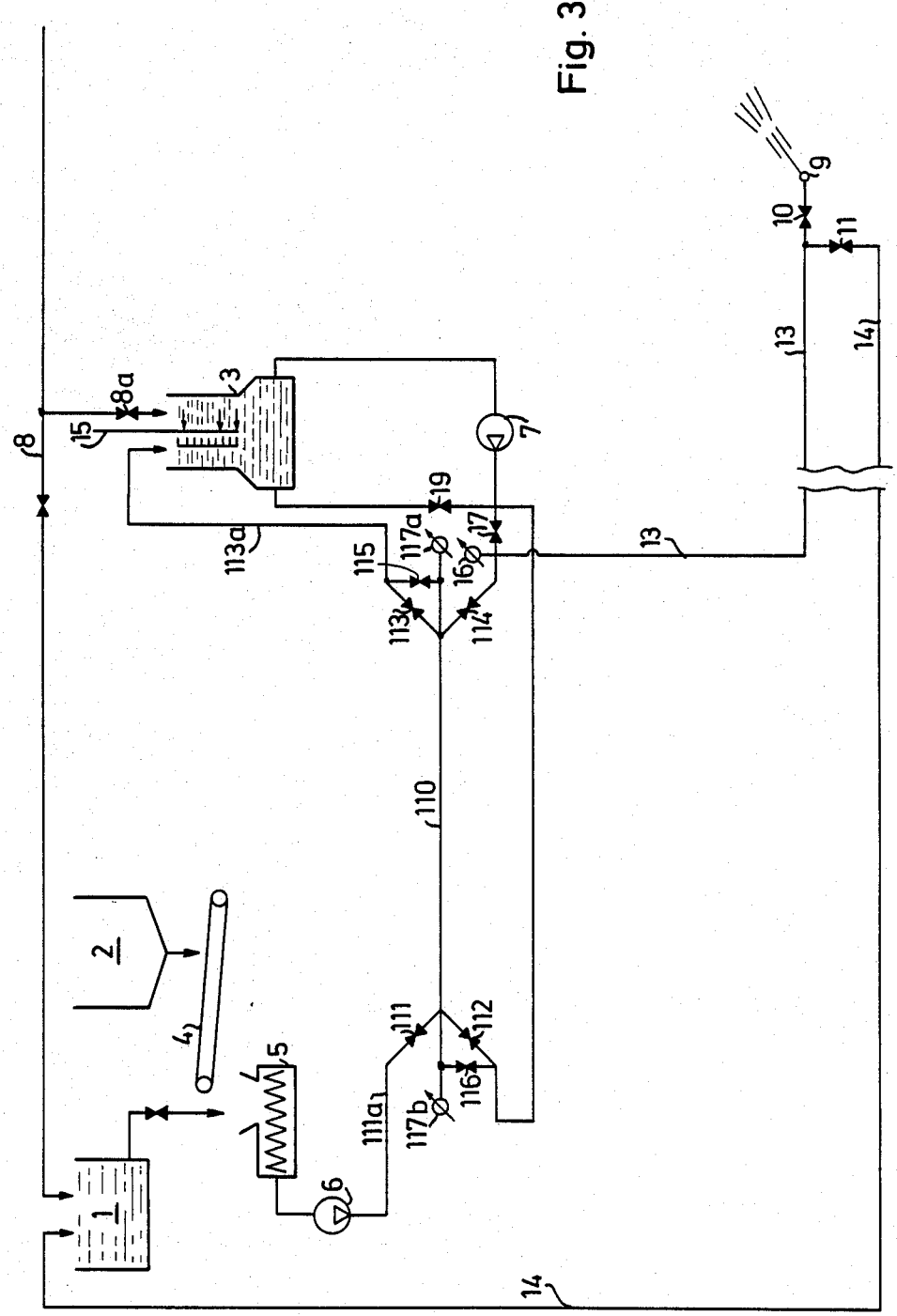
FIG. 3 is a representation similar to that shown in FIG. 1 of a tube-chamber distributor-system but which operates on the co-current principle.

The tube-chamber distributor-system illustrated in FIG. 3 of the drawings has fundamentally the same design and the same method of operation as the tube-chamber distributor-system shown in FIG. 1. The only difference is that the tube chamber 110 is not intended to work on the counter-current principle, but is designed for operation on the co-current principle.

In order to make this possible, in accordance with FIG. 3 the pressure-build-up gate valve 116 together with a contact manometer 117b for detection of the forwarding pressure is allocated to that end of tube chamber 110 where the filling gate valve 111 and the forwarding gate valve 112 are situated. At that end of the tube chamber 110 where the filling gate valve 113 and the forwarding gate valve 114 are provided, only the pressure-relief gate valve 115 and a contact manometer 117a, which can detect the filling pressure of the tube chamber 110, are present. In this case, the pressure-build-up gate valve 17 is closed immediately after the opening of the forwarding gate valves 114 and 112.

Figure 4:
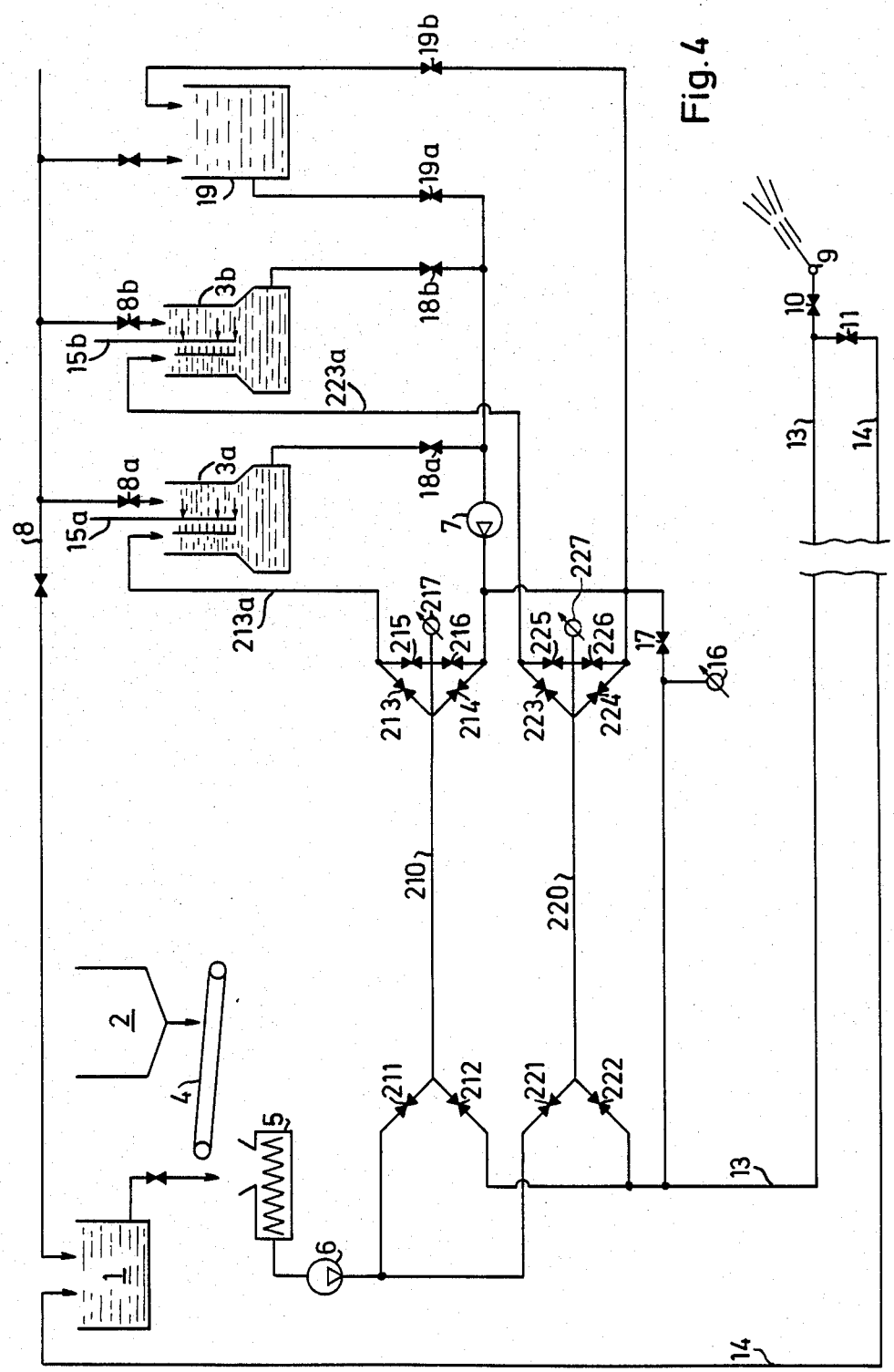
FIG. 4 is a diagrammatic representation of a tube-chamber distributor-system which has two tube chambers which operates on the counter-current principle.

A tube-chamber distributor-system illustrated in FIG. 4 of the drawing has fundamentally the same design as the tube-chamber distributor-system shown in FIG. 1 to the extent that its tube chambers 210 and 220 are designed for operation on the counter-current principle.

However, the tube-chamber distributor-system illustrated in FIG. 4 differs from the tube-chamber distributor-system shown in FIG. 1 because the two tube chambers 210 and 220 are designed to be operated in parallel.

The tube chamber 210 operates in conjunction with the filling gate valves 211 and 213, as well as with the forwarding gate valves 212 and 214. In addition to this, in the region of the filling gate valve 213 and the forwarding gate valve 214, the pressure-relief gate valve 215 and the pressure-build-up gate valve 216, as well as the contact manometer 217, are also present.

As a variation of the tube-chamber distributor-system shown in FIG. 1, that depicted in FIG. 4 also has a circulation liquid container 19 which, on the one hand can be connected to the suction side of the forwarding pump 7 by way of a circulation gate valve 19a whereas, on the other hand, it can be connected to the pressure side of the pump by way of the circulation gate valve 19b.

Figure 9:
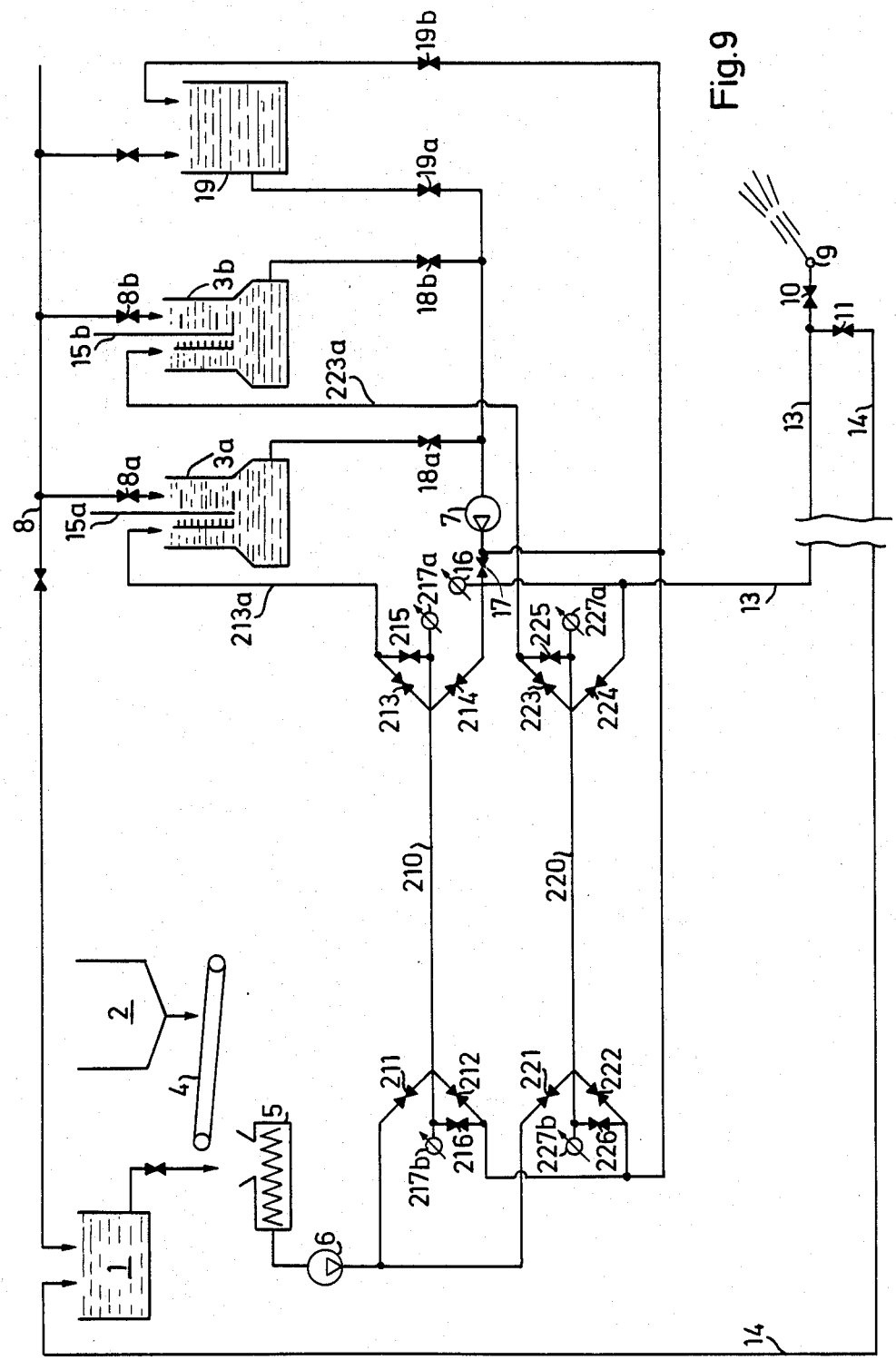
FIG. 9 is a similar representation to that shown in FIG. 4 of a tube-chamber distributor-system with two tube chambers which operates on the co-current principle.

In the case of the tube-chamber distributor-system shown in FIG. 9, this has a design which is substantially similar to that depicted in FIG. 4 but, whereas the tube-chamber distributor-system depicted in FIG. 4 is provided with tube chambers 210 and 220 which operate on the counter-current principle, the system shown in FIG. 9 has tube chambers 210 and 220 which operate on the co-current principle.

Equivalent to the tube-chamber distributor-system shown in FIG. 3 of the drawing, the pressure-build-up gate valve 216 and the contact manometer 217b are located in the region of the filling gate valve 211 and the forwarding gate valve 212, whereas the pressure-relief gate valve 215 and the contact manometer 217a are in the region of the filling gate valve 213 and the forwarding gate valve 214.

Correspondingly, in the case of tube chamber 220, the pressure-build-up gate valve 226 and the contact manometer 227b are located in the region of the filling gate valve 221 and the forwarding gate valve 222, whereas the pressure-relief gate valve 225 and the contact manometer 227a are in the region of the filling gate valve 223 and the forwarding gate valve 224.

It may be gleaned from FIGS. 5 to 8 of the drawings that the tube-chamber distributor-system as depicted in FIG. 4 and the corresponding system shown in FIG. 9 are operated in quite different ways.

Figure 5:
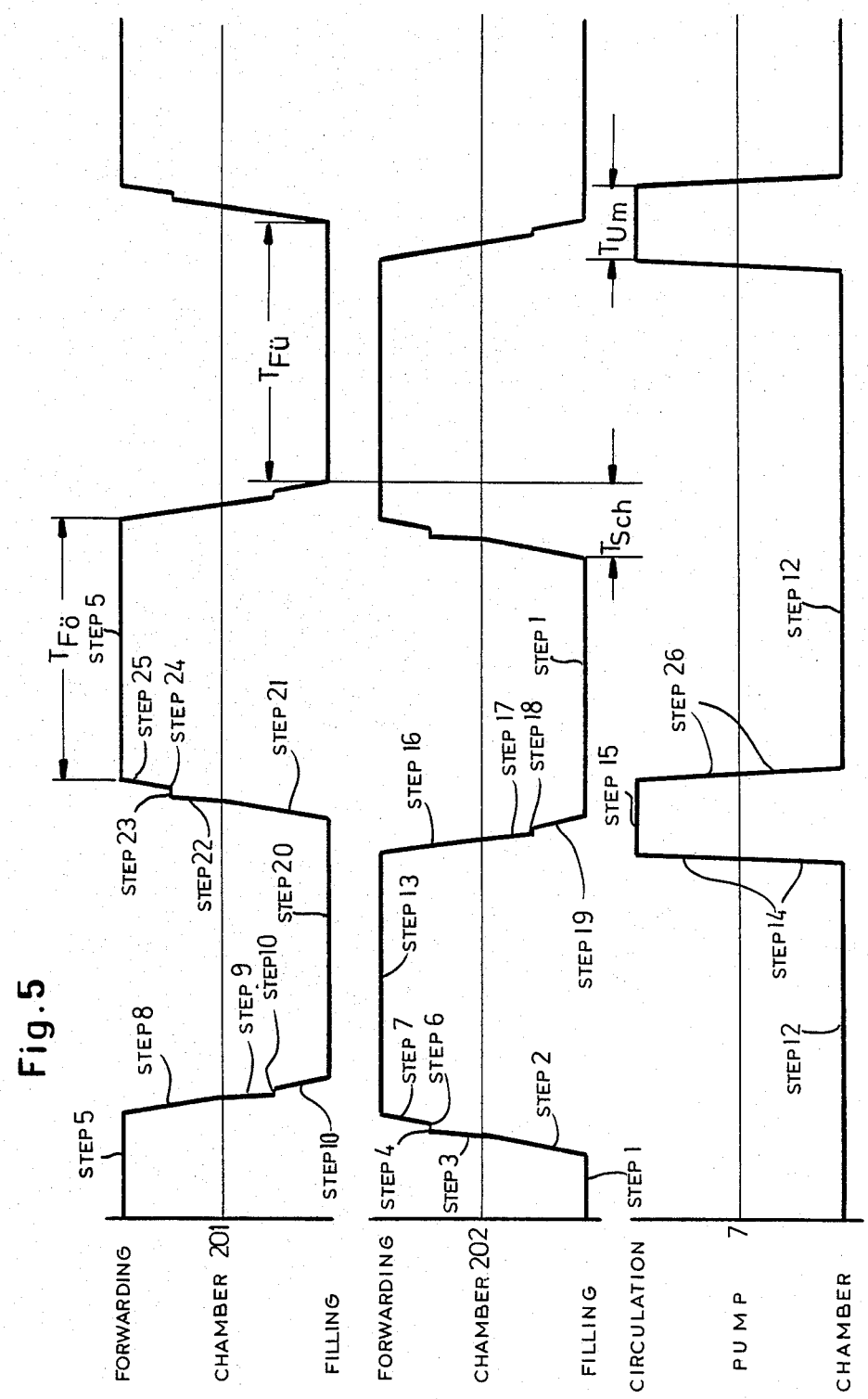
FIG. 5 is a timing- and operating-diagram for control of the tube-chamber distributor-system as shown in FIG. 4 with intermittent filling of, and intermittent forwarding from, the tube chamber.

According to FIG. 5, the tube-chamber distributor-systems as depicted in FIGS. 4 and 9 operate with 26 steps. First of all, the following assumptions are made:

$T_{Fo}$ = forwarding time interval = 50s $T_{Fu}$ = filling time interval = 50s $T_{Um}$ = circulation time interval = 14s $T_{Sch}$ = switching time interval = 14s.

Step 1: The volume measuring instrument 15b detects the maximum liquid level in the measuring container 3b.

Step 2: Filling gate valves 221 and 223 as well as pressure-relief valve 225 are closed. The filling procedure for the tube chamber 220 is terminated. By opening gate valve 8b, additional make-up liquid is admitted to the measuring container.

Step 3: The pressure-build-up gate valves 226 and 17 are opened and pressure is built up in the tube chamber 220 and the forwarding pipeline 13.

Step 4: The contact manometer 227 detects the forwarding pressure in the tube chamber 220 and in the forwarding pipeline 13.

Step 5: The volume measuring instrument 15a detects the minimum liquid level in the measuring container 3a.

Step 6: The stored series-switching of Steps 5 and 4 takes place.

Step 7: The forwarding gate valves 222 and 224 and the outlet gate valve 18b are opened, the pressure-build-up gate valve 17 for the forwarding pipeline 13 is closed and the outlet gate valve 18a is closed. The forwarding cycle commences in tube chamber 220 by introduction of the forwarding liquid into it from the measuring container 3b, whereas the supply of forwarding liquid from the measuring container 3a is shut off at the same time.

Step 8: The forwarding gate valves 212 and 214 and the pressure-build-up gate valve 216 are closed and the forwarding cycle in tube chamber 210 is terminated.

Step 9: The pressure-relief gate valve 215 to the tube chamber 210 is opened.

Step 10: The contact manometer 217 detects the filling pressure in the tube chamber 210.

Step 11: The filling gate valves 211 and 213 are opened. The filling procedure for tube chamber 210 is initiated.

Step 12: The forwarding pump 7 is used for chamber operation.

Step 13: The volume measuring instrument 15b detects the minimum liquid level in the measuring container 13b.

Step 14: The circulation gate valves 19a and 19b are opened. The forwarding pump 7 is switched over from chamber operation to the circulation operation.

Step 15: The forwarding pump 7 operates the circulation.

Step 16: The forwarding gate valves 222 and 224 as well as the pressure-build-up gate valve 226 are closed and the forwarding cycle of the tube chamber 220 is terminated.

Step 17: The pressure-relief gate valve 225 is opened and the pressure in tube chamber 220 is relieved.

Step 18: The contact manometer 227 detects the filling pressure in the tube chamber 220.

Step 19: The filling gate valves 221 and 223 are opened and the filling operation of the tube chamber 220 is initiated.

Step 20: The volume measuring instrument 15a detects the maximum liquid level in the measuring container 3a.

Step 21: The filling gate valves 211 and 213 and the pressure-relief gate valve 215 are closed so that the filling cycle of the tube chamber 210 is terminated. The gate valve 8a is opened and additional make-up liquid is admitted to the measuring container 3a.

Step 22: The pressure-build-up gate valves 216 and 17 are opened so that the pressure can be built up in the tube chamber 210 and the forwarding pipeline 13.

Step 23: The contact manometers 217 and 16 detect the forwarding pressure in the tube chamber 210 and in the forwarding pipeline 13.

Step 24: The stored series-switching of Steps 13 and 23 takes place.

Step 25: The forwarding gate valves 212 and 214 as well as the outlet gate valve 18a are opened. The forwarding procedure is initiated in the tube chamber 210 by the admission of forwarding liquid from the measuring container 3a. The outlet gate valve 18b and the pressure-build-up gate valve 17 are closed and shut off the supply of forwarding liquid from the measuring container 3b.

Step 26: The circulation gate valves 19a and 19b are closed. The forwarding pump then switches over from circulation to tube chamber operation.

Each working cycle of the tube-chamber distributor-system in accordance with FIGS. 4 and 9 takes place over a period of time which is derived from the sum of three terms $T_{Fo}$ = 50s, $T_{Fu}$ = 50s and $T_{Sch}$ = 14s, making a total of 114 seconds.

Figure 6:
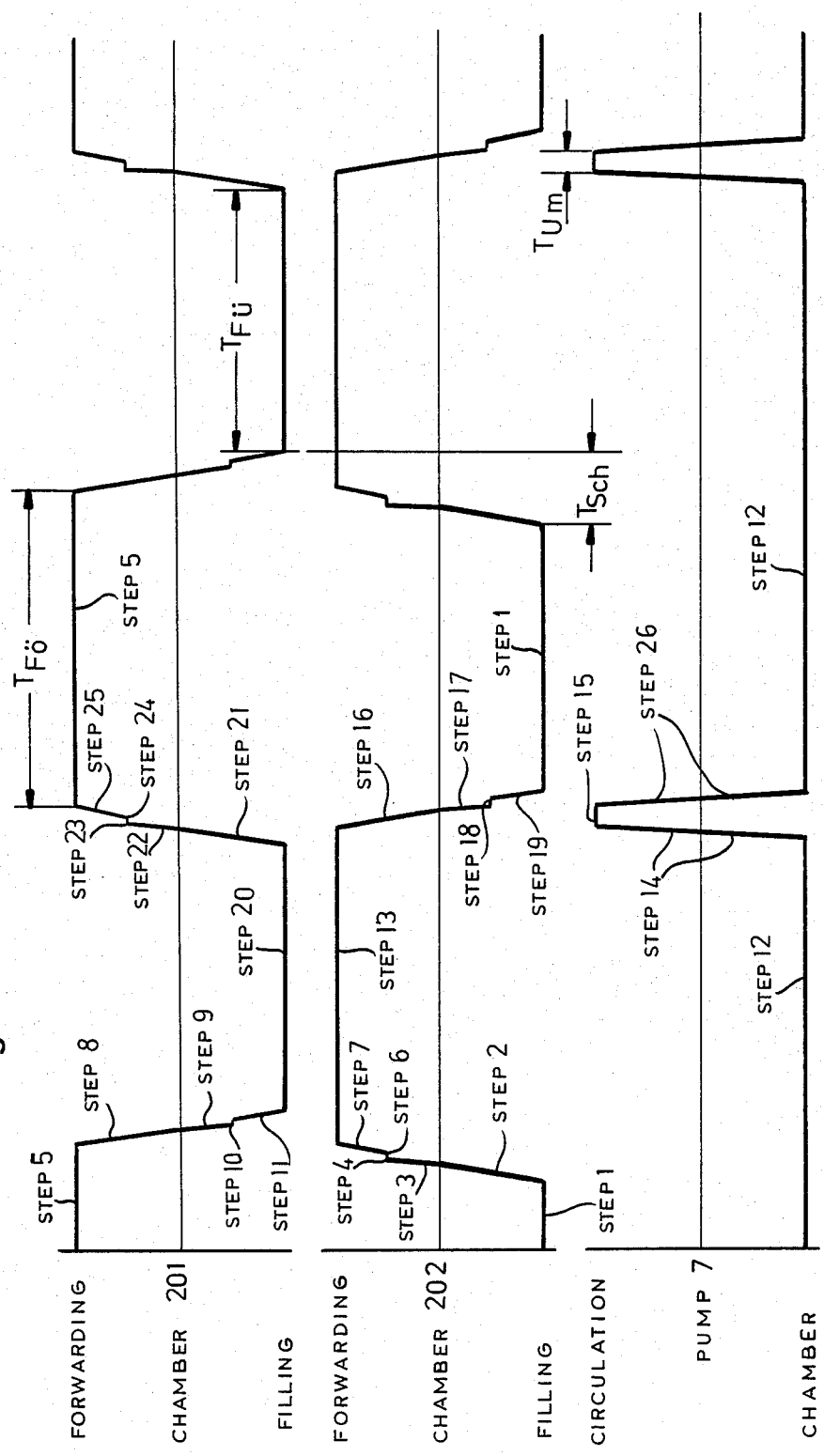
FIG. 6 is another timing- and operating-diagram for control of the tube-chamber distributor-system as shown in FIG. 4 with intermittent filling of, and intermittent forwarding from, the tube chamber.

In association with FIG. 6 of the drawing it is assumed that:

$T_{Fo}$ = forwarding time interval = 60s $T_{Fu}$ = filling time interval = 50s $T_{Sch}$ = switching time interval = 14s $T_{Um}$ = circulation time interval = 4s.

Each working cycle of the tube-chamber distributor-system takes place over a period of time which is derived from the sum of three terms $T_{Fo}$=60s, $T_{Fu}$=50s and $T_{Sch}$=14s, making a total of 124 seconds.

The extension of the forwarding time interval by 10s causes a decrease in the circulation time interval from 14s to 4s.

The number of working steps—twenty-six—does not change in comparison with FIG. 5.

Because of the time interval displacement, there is a superimposition of certain working procedures. This causes an alteration in the temporal sequence of the steps.

Figure 7:
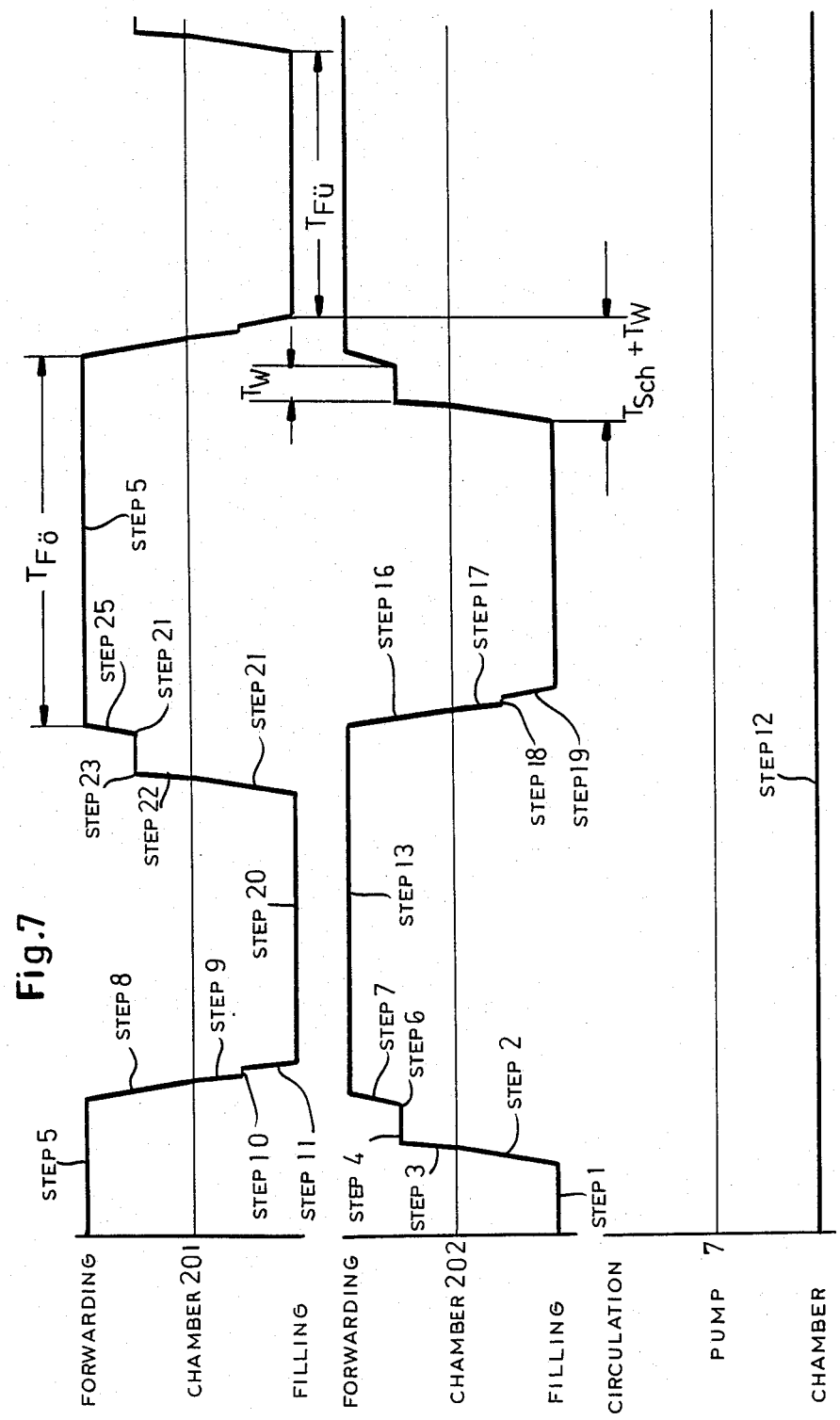
FIG. 7 is yet another timing- and operating-diagram for control of the tube-chamber distributor-system as shown in FIG. 4 with intermittent filling of, but with continuous forwarding from, the tube chamber.

The timing and working diagram as shown in FIG. 7 for the tube-chamber distributor-system shown in FIGS. 4 and 9 is based upon the following assumptions:

$T_{Fo}$ = forwarding time interval = 70s $T_{Fu}$ = filling time interval = 50s $T_{Sch}$ = switching time interval = 14s $T_W$ = waiting time interval = 6s.

Each complete working cycle takes place over a period of time which is derived from the sum of four terms $T_{Fo}$=70s, $T_{Fu}$=50s, $T_{Sch}$=14s and $T_W$=6s, making a total of 140s.

Compared with FIG. 6, the extension of the forwarding time interval by an additional 10s causes the disappearance of the circulation time interval $T_{Um}$=4s and the appearance of a waiting time interval of $T_W$=6s.

The steps 14, 15 and 26 which are associated with the timing and working diagram of FIG. 6 are abandoned here, because the forwarding pump 7 is constantly in the chamber operating mode for the continuous forwarding flow.

The temporal sequence of the remaining twenty-three working steps has changed, despite the retention of the same direction, as may be clearly seen from a comparison of FIG. 6 and FIG. 7.

Figure 8:
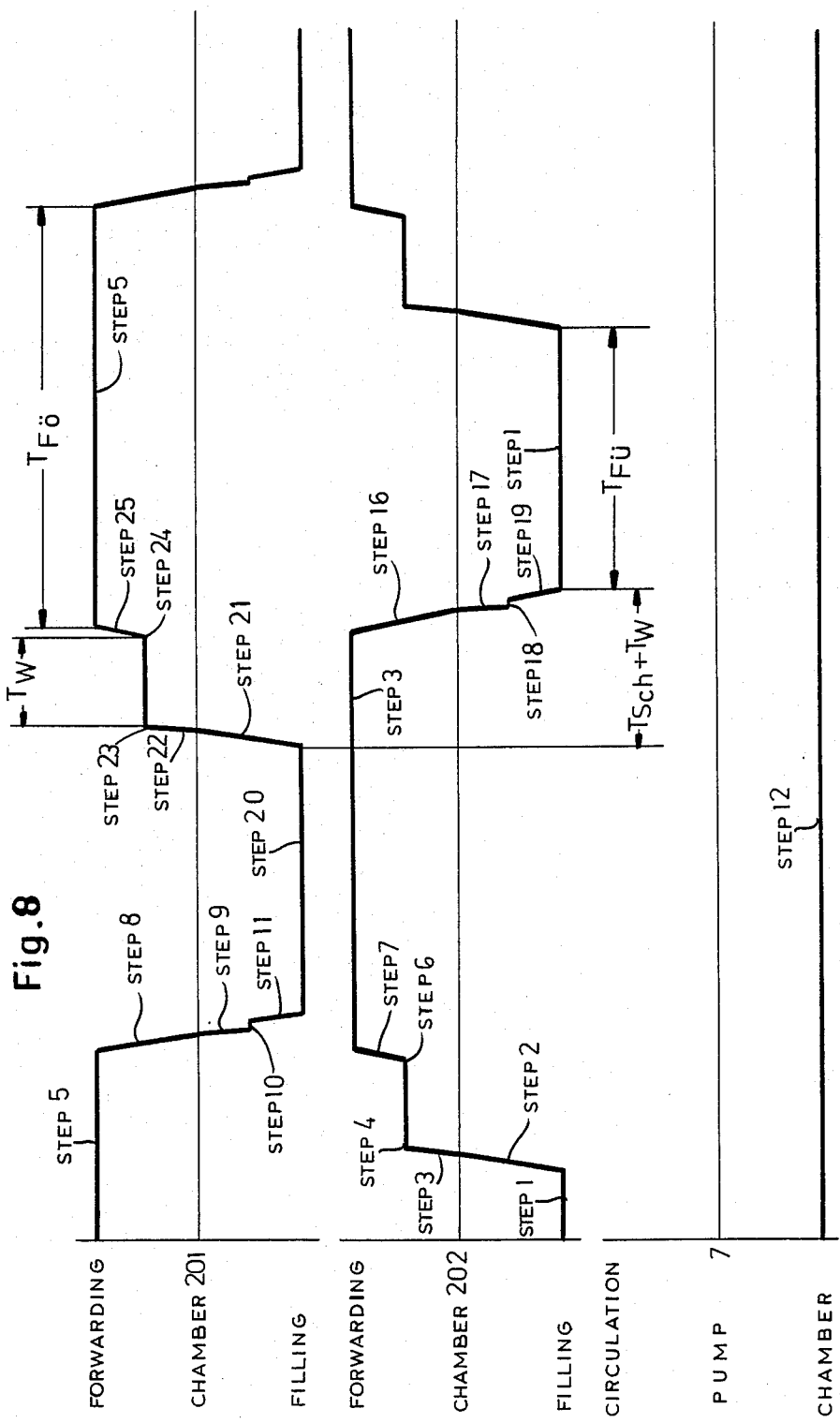
FIG. 8 is still another timing- and operating-diagram for control of the tube-chamber distributor-system as shown in FIG. 4 with intermittent filling of, and continuous forwarding from, the tube chamber.

Lastly, a tube-chamber distributor-system as shown in FIGS. 4 and 9 can be operated in the manner depicted in FIG. 8. There the following assumptions are applicable:

$T_{Fo}$ = forwarding time interval = 80s $T_{Fu}$ = filling time interval = 50s $T_{Sch}$ = switching time interval = 14s $T_W$ = waiting time interval = 16s.

Each complete working cycle takes place over a period of time which is derived from the sum of four terms $T_{Fo}$=80s, $T_{Fu}$=50s, $T_{Sch}$=14s and $T_W$=16s, making a total of 160s.

The further extension of the forwarding time interval by an additional 10s causes an increase of 10s in the waiting time interval to $T_W$=16s.

The complete cycle time interval is thus increased by 20s.

Figure 10:
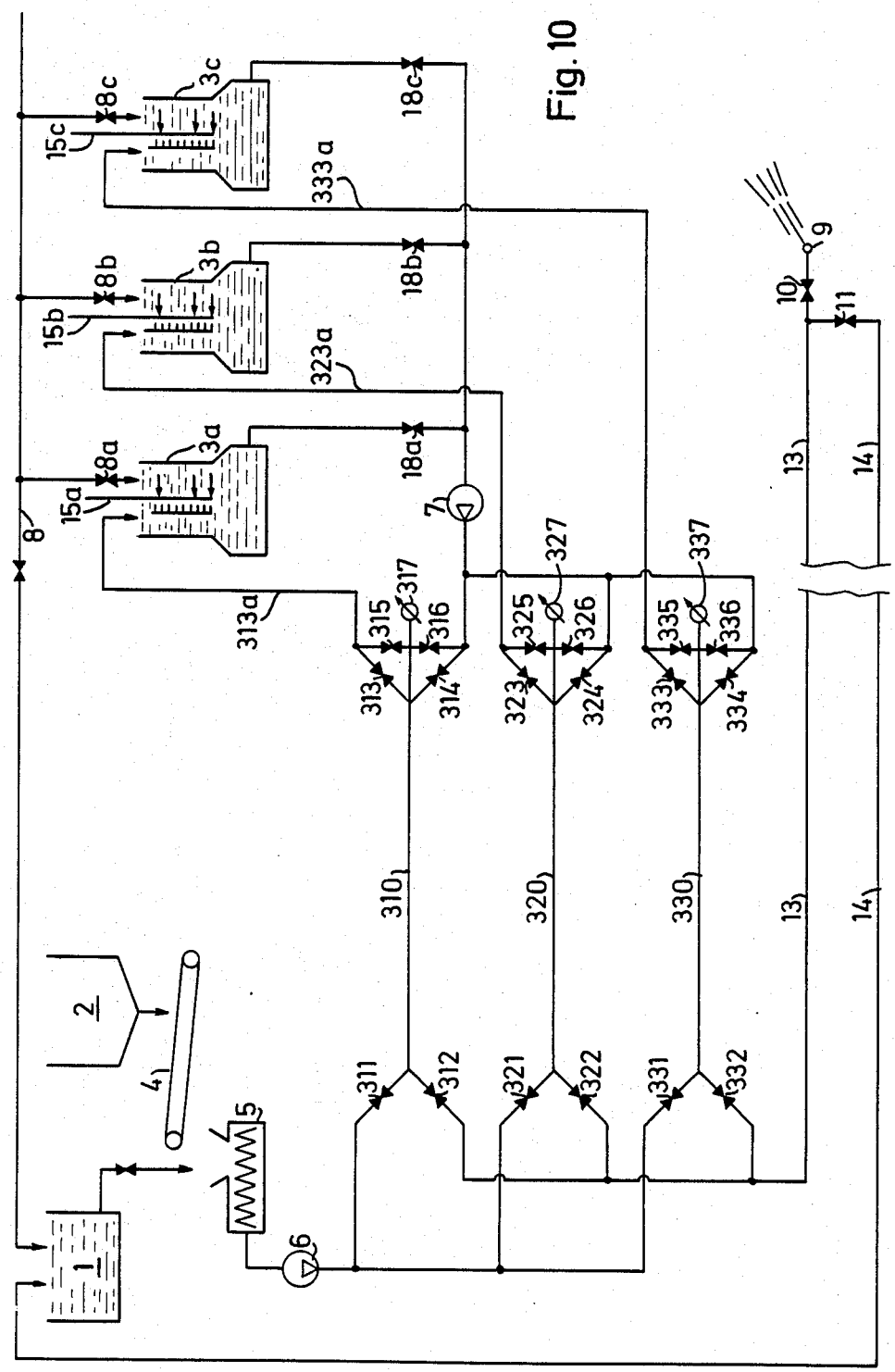
FIG. 10 is a diagrammatic representation of a tube-chamber distributor-system which has three or more tube chambers which operates on the counter-current principle.

The tube-chamber distributor-system illustrated in FIG. 10 differs from the tube-chamber distributor-system shown in FIG. 4 only by the presence of three tube chambers 310, 320 and 320 designed to be operated in parallel, where each of said chambers acts in conjunction with its own measuring container 3a, 3b and 3c, each of which is provided with its own individual volume measuring instrument 15a, 15b and 15c respectively.

All the tube chambers 310, 320 and 330 are operated on the counter-current principle in such a manner that the entire tube-chamber distributor-system functions with continuous filling and continuous forwarding procedures. The tube chamber 310 is furnished at one end with the filling gate valve 311 and the forwarding gate valve 312, whereas it is furnished at the other end with the filling gate valve 313 and the forwarding gate valve 314.

In addition to this, in the region of the filling gate valve 313 and the forwarding gate valve 314, the pressure-relief gate valve 315 and the pressure-build-up gate valve 316, as well as the contact manometer 317, are also present.

The tube chamber 320 is furnished at one end with the filling gate valve 321 and the forwarding gate valve 322, whereas it is furnished at the other end with the filling gate valve 323 and the forwarding gate valve 324 and, in addition, the pressure-relief gate valve 325 and the pressure-build-up gate valve 326, as well as the contact manometer 327, are also present.

The tube chamber 330 is furnished at one end with the filling gate valve 331 and the forwarding gate valve 332, whereas it is furnished at the other end with the filling gate valve 333 and the forwarding gate valve 334 and, in addition, the pressure-relief gate valve 335 and the pressure-build-up gate valve 336, as well as the contact manometer 337, are also present.

The tube chamber 310 is connected to the measuring container 3a by way of the filling gate valve 313 and the pipeline 313a, where container 3a is connected to the forwarding gate valve 314 by way of the outlet valve 18a and the forwarding pump 7.

The tube chamber 320 is connected to the measuring container 3b by way of the filling gate valve 323 and the pipeline 323a, where container 3b is connected to the forwarding gate valve 324 by way of the outlet valve 18b and the forwarding pump 7.

Lastly, the tube chamber 330 is connected to the measuring container 3c by way of the filling gate valve 333 and the pipeline 333a, where container 3c is connected to the forwarding gate valve 334 by way of the outlet valve 18c and the forwarding pump 7.

Each of the three measuring containers 3a, 3b and 3c can be supplied with additional make-up liquid from pipeline 8 through the gate valves 8a, 8b and 8c respectively.

Figure 11:
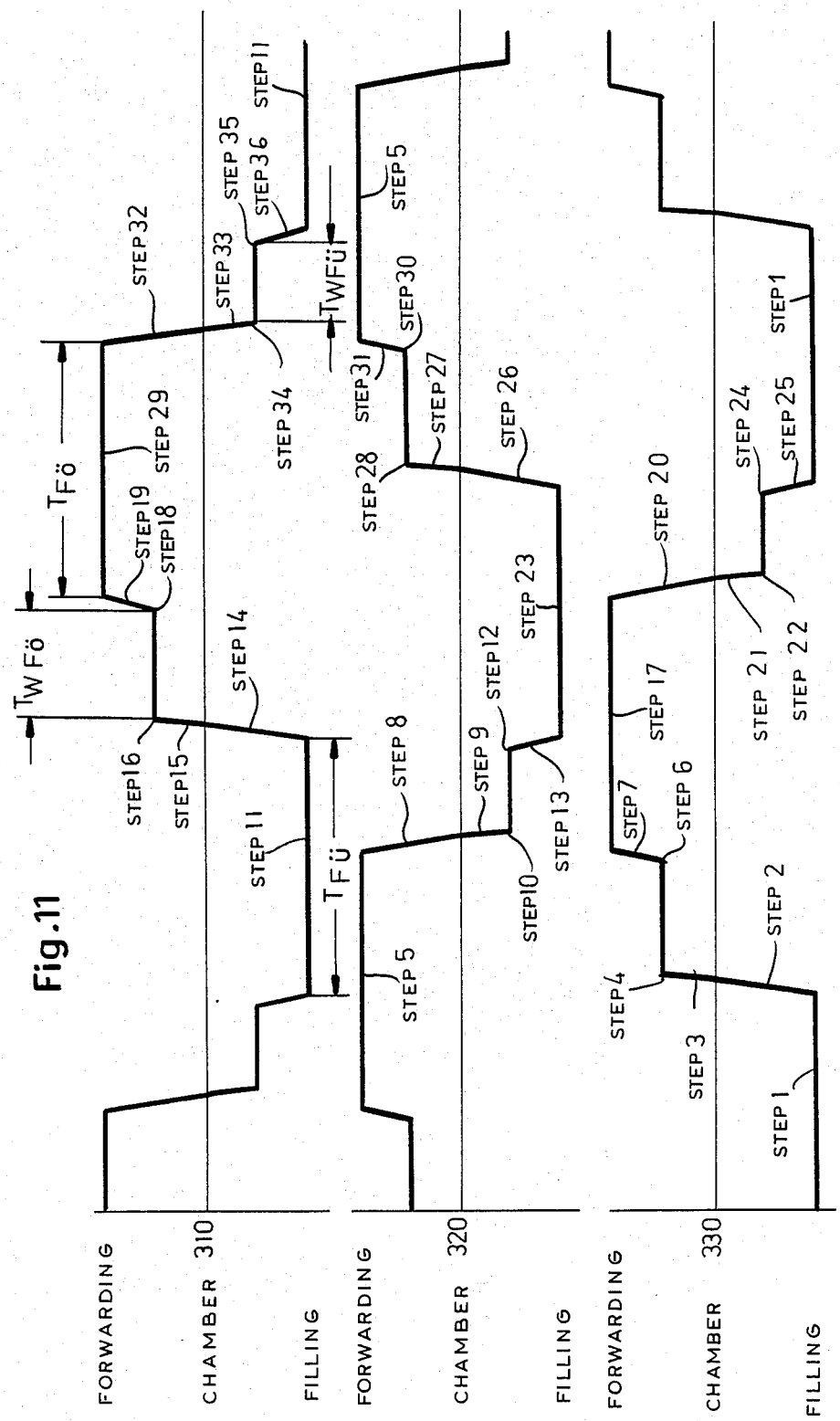
FIG. 11 is a timing- and operating-diagram for control of the tube-chamber distributor-system as shown in FIG. 10 with continuous filling of, and continuous forwarding from, the tube chamber.

As may be gleaned from FIG. 11, the tube-chamber distributor-system in accordance with FIG. 10 operates with thirty-six different working steps. The method of operation of the tube-chamber distributor-system in accordance with FIG. 10 is based upon the following conditions:

$T_{Fo}$ = forwarding time interval = 50s $T_{Fu}$ = filling time interval = 50s $T_{WFo}$ = waiting time interval before forwarding = 21s $T_{WFu}$ = waiting time interval before filling = 15s $T_{Sch}$ = switching time interval = 14s.

so that a complete working cycle lasts for 150 seconds.

The method of operation of the tube-chamber distributor-system proceeds as follows:

Step 1: The volume measuring instrument 15c detects the maximum liquid level in the measuring container 3c.

Step 2: Filling gate valves 331 and 333 as well as pressure-relief valve 335 are closed. The filling procedure for the tube chamber 330 is terminated. By opening gate valve 8c, additional make-up liquid is admitted to the measuring container 3c. The gate valve 8c is then closed.

Step 3: The pressure-build-up gate valve 336 is opened and pressure is built up in the tube chamber 330.

Step 4: The contact manometer 337 detects the forwarding pressure in the tube chamber 330.

Step 5: The volume measuring instrument 15b detects the minimum liquid level in the measuring container 3b.

Step 6: The series-switching of Steps 4 and 5 takes place.

Step 7: The outlet gate valve 18c is opened, so that forwarding liquid from measuring container 3c is supplied to the forwarding pump 7. The forwarding gate valves 332 and 334 of tube chamber 330 are opened so that the forwarding procedure is initiated here. By closing the outlet gate valve 18b, the supply of forwarding liquid from measuring container 3b to the forwarding pump 7 is shut off.

Step 8: The forwarding gate valves 322 and 324 and the pressure-build-up gate valve 326 are closed and the forwarding cycle in tube chamber 320 is terminated.

Step 9: The pressure-relief gate valve 325 is opened to relieve the pressure in tube chamber 320.

Step 10: The contact manometer 327 detects the filling pressure in the tube chamber 320.

Step 11: The volume measuring instrument 15a detects the maximum liquid level in the measuring container 3a.

Step 12: The series-switching of Steps 10 and 11 takes place.

Step 13: The filling gate valves 321 and 323 are opened. The filling procedure for tube chamber 320 is initiated.

Step 14: The gate valve 8a is opened so that the required amount of additional forwarding liquid is admitted to measuring container 3a until gate valve 8a is closed. The filling gate valves 311 and 313 as well as the pressure-relief gate valve 315 are now closed so that the filling cycle of tube chamber 310 is terminated.

Step 15: The pressure-build-up gate valve 316 is opened so that pressure is built up in tube chamber 310.

Step 16: The contact manometer 317 detects the forwarding pressure in tube chamber 310.

Step 17: The volume measuring instrument 15c detects the minimum water level in measuring container 3c.

Step 18: The series-switching of Steps 16 and 17 takes place.

Step 19: The outlet gate valve 18a is opened so that forwarding liquid from measuring container 3a is supplied to forwarding pump 7. At the same time, the forwarding gate valves 312 and 314 are opened so that the forwarding cycle of tube chamber 310 is initiated. By closing the outlet gate valve 18c, the supply of forwarding liquid from measuring container 3c to the forwarding pump 7 is shut off.

Step 20: The forwarding gate valves 332 and 334 as well as the pressure-build-up gate valve 336 are closed so that the forwarding operation from tube chamber 330 is terminated.

Step 21: The pressure-relief gate valve 335 is opened so that the pressure is relieved in tube chamber 330.

Step 22: The contact manometer 337 detects the filling pressure in the tube chamber 330.

Step 23: The volume measuring instrument 15b detects the maximum water level in measuring container 3b.

Step 24: The series-switching of Steps 22 and 23 takes place.

Step 25: The filling gate valves 331 and 333 are opened and the filling operation of the tube chamber 330 is initiated.

Step 26: The gate valve 8b is opened so that the required amount of additional forwarding liquid is admitted to measuring container 3b until gate valve 8b is closed. The filling gate valves 321 and 323 as well as the pressure-relief gate valve 325 are now closed so that the filling cycle of tube chamber 320 is terminated.

Step 27: The pressure-build-up gate valve 326 is opened so that pressure is built up in tube chamber 320.

Step 28: The contact manometer 327 detects the forwarding pressure in tube chamber 320.

Step 29: The volume measuring instrument 15a detects the minimum water level in measuring container 3a.

Step 30: The series-switching of Steps 24 and 30 takes place.

Step 31: The outlet gate valve 18b is opened so that forwarding liquid from measuring container 3b is supplied to forwarding pump 7. At the same time, the forwarding gate valves 322 and 324 are opened so that the forwarding cycle of tube chamber 320 is initiated. By closing the outlet gate valve 18a, the supply of forwarding liquid from measuring container 3a to the forwarding pump 7 is shut off.

Step 32: The forwarding gate valves 312 and 314 as well as the pressure-build-up gate valve 316 are closed so that the forwarding operation from tube chamber 310 is terminated.

Step 33: The pressure-relief gate valve 315 is opened so that the pressure is relieved in tube chamber 310.

Step 34: The contact manometer 317 detects the filling pressure in the tube chamber 310.

Step 1: The volume measuring instrument 15c detects the maximum liquid level in the measuring container 3c.

Step 35: The series-switching of Steps 1 and 34 takes place.

Step 36: The filling gate valves 311 and 313 are opened so that the filling cycle in tube chamber 310 is initiated.

Figure 12:
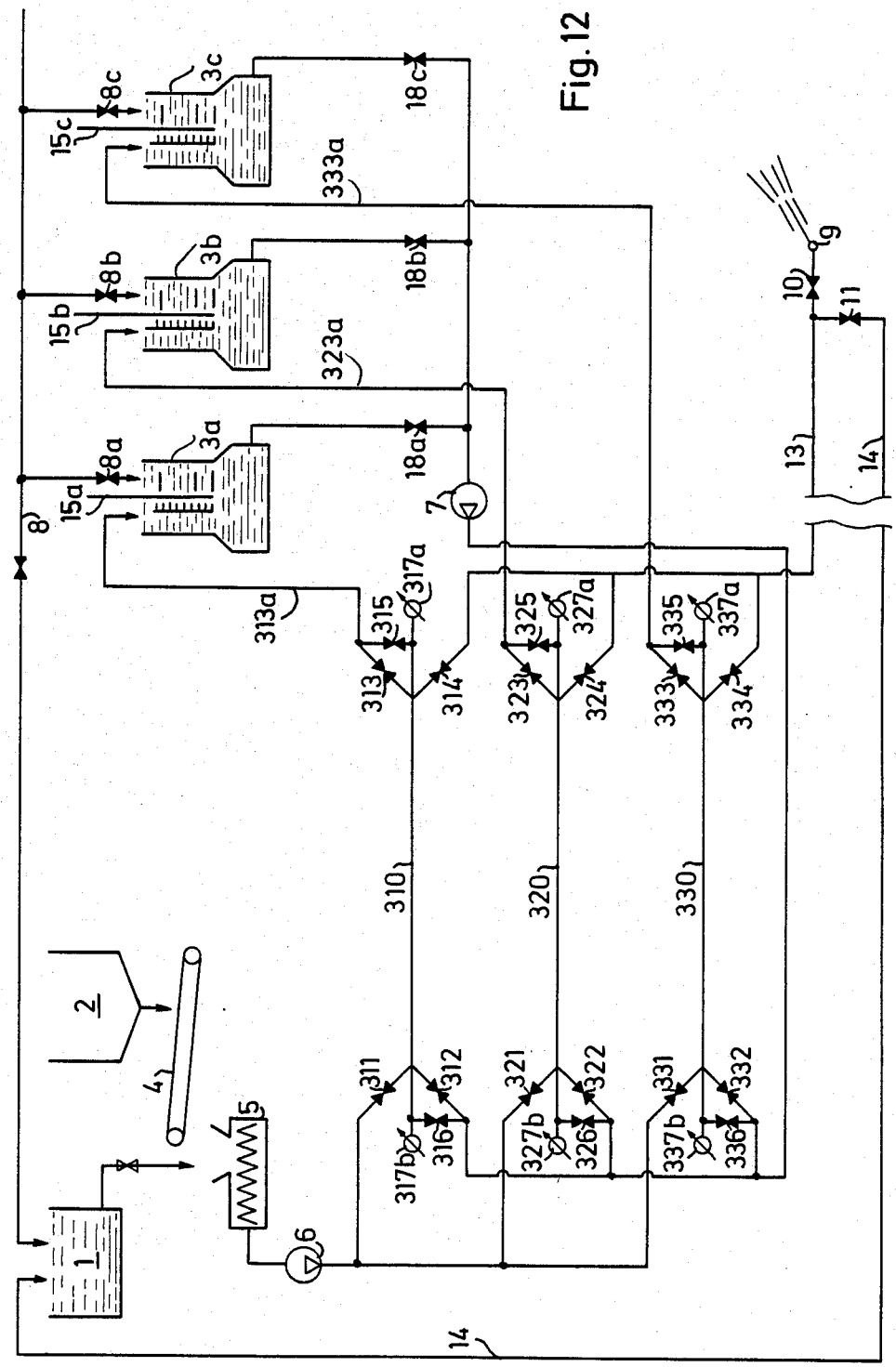
FIG. 12 is a representation similar to that shown in FIG. 10 of a tube-chamber distributor-system with three or more tube chambers but which operates on the co-current principle.

It will be understood that the tube-chamber distributor-system as shown in FIG. 12 operates with the same series of steps, with the only practical difference being that the tube chambers 310, 320 and 330 are all designed for co-current operation.

According to FIG. 12, in the case of tube chamber 310, in the region of the filling gate valve 311 and the forwarding gate valve 312, the pressure-build-up gate valve 316, as well as the contact manometer 317b are present, whereas, in the region of the filling gate valve 313 and the forwarding gate valve 314, the pressure-relief gate valve 315 and the contact manometer 317a are present.

In the case of tube chamber 320, in the region of the filling gate valve 321 and the forwarding gate valve 322, the pressure-build-up gate valve 326, as well as the contact manometer 327b are present. In the region of the filling gate valve 323 and the forwarding gate valve 324, the pressure-relief gate valve 325 and the contact manometer 327a are present.

In the case of tube chamber 330, in the region of the filling gate valve 331 and the forwarding gate valve 332, the pressure-build-up gate valve 336, as well as the contact manometer 337b are present, whereas, in the region of the filling gate valve 333 and the forwarding gate valve 334, the pressure-relief gate valve 335 and the contact manometer 337a are present.

Whereas the contact manometers 317a, 327a and 337a are respectively used to detect the filling pressure in the tube chambers 310, 320 and 330, the contact manometers 317b, 327b and 337b are respectively used to detect the forwarding pressure in said chambers. Otherwise, the method of operation of the tube-chamber distributor-system as shown in FIG. 12 is exactly the same as that described in relation to the system depicted in FIG. 11.

Attention is drawn to the fact that—in contrast to the representations in the drawings—it is also possible to operate tube-chamber distributor-systems of the type described in the foregoing text, which include any arbitrarily selected number, greater than three, of tube chambers and their associated measuring containers.

No details of the method of operation of the entire tube-chamber distributor-system are fundamentally altered because of the increase of the number of tube chambers and their associated measuring containers.

Up till the present stage, only those tube-chamber distributor-systems have been discussed in which the volume and/or weight of the forwarding liquid which has been expelled from the particular tube chamber involved by the slurry which has been filled into it has been measured and/or collected with the aid of its own individual measuring container.

As a variation of this procedure it is also possible to measure the amount of forwarding liquid, expelled from a particular tube chamber by the incoming slurry, with the aid of a flow-volume meter and a record can be made of this amount for each individual tube chamber. In this case, the amount of forwarding liquid required for the operation of all the tube chambers can be collected in the same common container.

It will naturally be understood that it is also possible in this instance to collect the forwarding liquid expelled from the various tube chambers in separate containers.

In all cases, it is important for the orderly operation of the previously-described tube-chamber distributor-system that the volume and/or weight of the forwarding liquid expelled from the individual tube chambers by the incoming slurry should be measured and/or collected so that the discharge of the slurry from any particular tube chamber into the forwarding pipeline can be effected, under pressure, with the use of the amount of forwarding liquid equivalent to that previously measured and/or collected.

What is claimed:

1. A method of transporting solids, comprising the steps of:
   (a) forming a slurry of said solids in a transport liquid;
   (b) filling at least one tube chamber of a tube-chamber distributor system operating in accordance with booster displacement principles and having shutoff devices controlling flow from and to said tube chamber, with a transport liquid;
   (c) displacing a quantity of said transport liquid from said tube chamber by introducing a corresponding quantity of said slurry into said tube chamber;
   (d) measuring the quantity of transport liquid displaced from said tube chamber by the introduction of said slurry into said tube chamber in step (c);
   (e) forcing said transport liquid under pressure into said tube chamber to displace under pressure said slurry from said tube chamber into a transport pipeline and along said transport pipeline;
   (f) terminating the forcing of said transport liquid into said tube chamber in step (e) in accordance with the quantity of displaced transport liquid measured in step (d), thereby reintroducing into said tube chamber a quantity of said transport liquid at least equal to the measured quantity displaced therefrom in step (c); and
   (g) repeating steps (c)–(f) to displace said solids along said pipeline.

2. The method defined in claim 1 wherein the transport liquid displaced from the tube chamber is collected in measuring vessels so that the level of the liquid before the discharge may be compared with the level of the liquid on completion of the discharge by means of measuring instruments.

3. The method defined in claim 1 wherein the quantity of transport liquid displaced from the tube chamber is determined by a volume-flow meter.

4. The method defined in claim 1 wherein the quantity of transport liquid displaced from the tube chamber is collected in several relatively small portions which are subsequently fed simultaneously into the tube chamber in order to expel slurry therefrom.

5. The method defined in claim 1 wherein quantities of transport liquid displaced from the tube chamber of said tube-chamber distributor system are collected together in a common receptacle for use later in several separate portions for expelling slurry from the various tube chambers.

6. The method defined in claim 1 wherein the quantity of transport liquid displaced, compared with a previously displaced quantity, is proportionally supplemented by at least a volume required to fill a shut-off device through which the liquid flows on a transport side of the chamber.

7. The method defined in claim 1 wherein the slurry and the transport liquid are supplied to and discharged from the tube chamber in co-current flow.

8. The method defined in claim 1 wherein the slurry and the transport liquid are supplied to and discharged from the tube chamber countercurrent flow.

9. An apparatus for transporting solids through a pipeline, comprising:
   a tube-chamber distributor system having at least one tube chamber formed with shutoff devices controlling the filling and discharge of at least one tube chamber of said distributor system and connectable by at least one of said shutoff devices with said pipeline;
   means for forming a slurry of solids to be displaced along said pineline in a transport liquid and connectable to said tube chamber by a respective one of said shutoff devices;

means for filling said tube chamber through at least one of said shutoff devices with said transport liquid;

means for introducing said slurry into said tube chamber to displace a quantity of said transport liquid from said tube chamber;

measuring means connectable to said tube chamber by at least one of said shutoff devices for measuring the quantity of transport liquid displaced from said tube chamber by the introduction of said slurry into said tube chamber;

a pressure pump connectable to said tube chamber by at least one of said shutoff devices for forcing transport liquid under pressure into said tube chamber to displace said slurry from said tube chamber into said pipeline; and means for terminating the forcing of the transport liquid into said tube chamber in accordance with the measured quantity of transport liquid displaced from said tube chamber, thereby reintroducing into said tube chamber a quantity of transport liquid at least equal to that which was displaced from said tube chamber by the introduction of said slurry into said tube chamber.

10. The apparatus defined in claim 9 wherein said, tube-chamber distributor system has a plurality of said tube chambers each connected alternately by shut-off devices to a slurry filling station and to said transport pipeline and alternately to said slurry transport pipeline and to a transport liquid supply line, wherein each of said tube chambers operates as a pressure sluice on the booster principle by the simultaneous opening of the shut-off device to the slurry transport pipeline and to the transport liquid supply line, and a respective measuring means is allocated to a return circulation of the transport liquid of each tube chamber for determining the amount of transport liquid returned.

11. The apparatus defined in claim 10, wherein the measuring means comprises at least one flow-volume meter and a collection receptacle connected to the transport liquid return circulation pipeline of the respective tube chamber.

12. The apparatus defined in claim 10 wherein the measuring means for each tube chamber is provided with its own flow-volume meter.

13. The apparatus defined in claim 10, wherein each tube chamber is provided with at least one collection receptacle of its own.

14. The apparatus defined in claim 10, wherein a flow-volume meter for each tube chamber is connected to a computer which is used to vary a make-up, control and regulating system for the supply of high-pressure transport liquid to each tube chamber.

15. The apparatus defined in claim 10 wherein the measuring means includes a measuring container, which contains, as measuring instrument, a minimum-filling-level meter and a maximum-filling-level meter in communication with a make-up, control and regulating system for the supply of transport liquid.

16. The apparatus defined in claim 10, wherein each tube chamber can be charged, on the countercurrent principle, alternately, with slurry and transport liquid.

17. The apparatus defined in claim 10, wherein each tube chamber can be charged, on the co-current principle, alternately, with slurry and transport liquid.

18. The apparatus defined in claim 10, wherein the shut-off devices from the transport liquid supply to the tube chambers and the shut-off devices from the tube chambers to the transport liquid return circulation are in each case of smaller dimensions than the shut-off devices from the slurry filling station to the tube chambers as well as the shut-off devices from the tube chambers to the transport pipeline.

19. The apparatus defined in claim 10, wherein the tube-chamber distributor-system comprises at least two tube chambers which can be operated alternately for transport of slurry and for filling with slurry.

* * * * *